March 11, 1958   M. MARON   2,826,717
SENSITIVITY ADJUSTING CIRCUIT
Filed Sept. 23, 1950
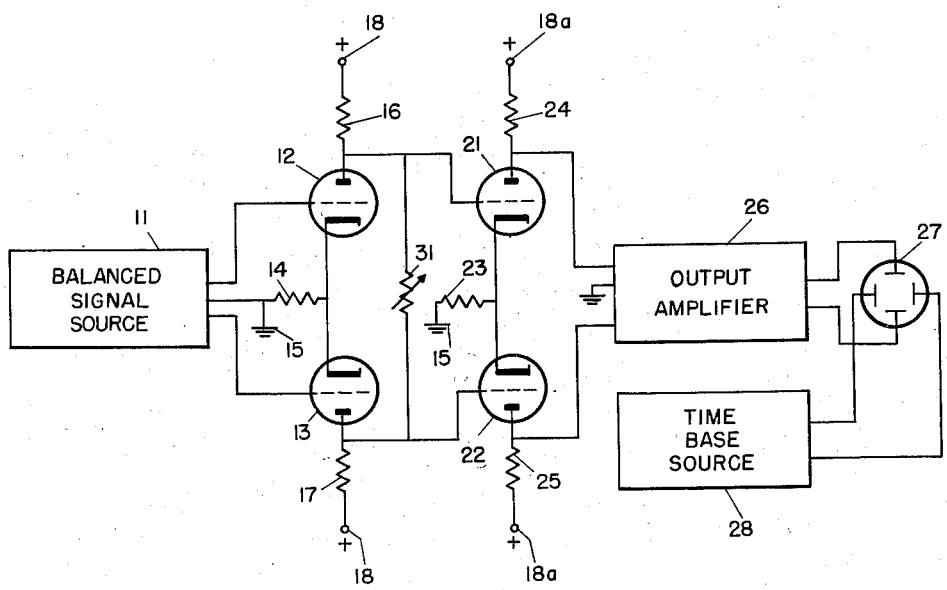
INVENTOR.
MEYER MARON
BY Darby & Darby
ATTORNEYS United States Patent Office 2,826,717
Patented Mar. 11, 1958

2,826,717
SENSITIVITY ADJUSTING CIRCUIT

Meyer Maron, Passaic, N. J., assignor to Allen B. Du Mont Laboratories, Inc., Clifton, N. J., a corporation of Delaware Application September 23, 1950, Serial No. 186,472

1 Claim. (Cl. 315—23)

The present invention relates to a new and improved adjustable sensitivity circuit for use in a balanced and stabilized direct current amplifier. It is particularly useful in connection with a deflection amplifier for cathode-ray oscillographs, such as described in my copending application Serial No. 186,475, now abandoned, entitled "Circuit for Cathode-Ray Oscillograph," filed concurrently herewith and assigned to the same assignee as the present application.

Direct current amplifiers are widely used in cathode-ray oscillographs to produce changes in the position of the trace of the cathode-ray beam in accordance with changes in the level of a direct current or alternating current applied signal. One of the difficulties heretofore experienced when using such amplifiers has been the attainment of proper stability for direct current operation which is sometimes destroyed or impaired by excess sensitivity.

According to the present invention, it has been found that it is possible to adjust the sensitivity (and hence to improve the stability) by the extremely simple and convenient expedient of directly connecting the anodes of the two tubes of a balanced stage of a deflection amplifier by means of an adjustable resistance. This is utilized as a factory adjustment to set the sensitivity at a desired predetermined value whereby accurate quantitative examination of signals under test may be had.

Other objects and advantages of the present invention will become more apparent by the following description of a preferred embodiemnt thereof, taken in conjunction with the appended drawing which in its single figure shows a schematic circuit diagram partially in block form of a system incorporating the present invention.

Referring to the drawing, the rectangle 11 represents any balanced signal source which it may be desired to measure or indicate. For example, the circuits represented by rectangle 11 may include an unbalanced signal source plus preliminary amplification stages which may include phase inverters or the equivalent to produce a balanced signal output. An example of such circuits is shown in copending application Serial No. 186,478, now Patent No. 2,631,200, entitled "Gain Control Circuit" by Peter S. Christaldi, filed concurrently herewith and assigned to the same assignee as the present invention.

This balanced signal output is supplied to an amplifier stage consisting of tubes 12 and 13 in balanced arrangement. While these tubes are illustrated as being of the triode type having respective cathodes, control grids and anodes, it will be understood that any other suitable tube types such as tetrodes, pentodes, beam power tubes or the like may be used where desired. The balanced signal output from source 11 is applied symmetrically to the two control grids of tubes 12 and 13. The cathodes of these tubes are connected together and through a common cathode resistor 14 to ground at 15. The anodes of tubes 12 and 13 are connected through respective load resistors 16 and 17 to a suitable source of positive potential 18 which may, for example, be a battery or a rectifier-type power supply as desired.

The output of tubes 12 and 13 is supplied directly to the tubes 21 and 22 of the following stage, also illustrated as triodes although other types of tubes such as mentioned above may be used. This is done by a direct wire connection between the anodes of the tubes 12 and 13 and the respective control grids of tubes 21 and 22. The cathodes of tubes 21 and 22 are connected together and through a common cathode resistor 23 to ground at 15. The anodes of tubes 21 and 22 are connected through respective load resistors 24, 25 to a source of positive potential 18a which may be the same source as 18 or may be independent thereof as desired.

The output from tubes 21 and 22 is similarly derived from their anodes and is supplied to any suitable balanced output amplifier indicated schematically by rectangle 26, whose output in turn supplies one set of deflection plates of a cathode-ray tube 27. A suitable form of output amplifier is shown in my copending application Serial No. 186,471, now Patent No. 2,631,260, entitled "Compensating Amplifier," filed concurrently herewith and assigned to the same assignee as the present application. In this instance the vertical plates are so supplied, although it will be understood that the same system may be used for the horizontal plates where desirable. In the present circuit the horizontal deflecting plates are supplied by another signal from a suitable source illustrated as a time base source 28. It will be understood here also that any desired signals may be applied to the horizontal deflecting plates in accordance with the desired measurements.

As indicated above, in direct coupled amplifiers of the type just described, it it important that the sensitivity be limited in order to avoid instability. It is also important that the sensitivity be made relatively readily adjustable to a predetermined value so that the degree of amplification of any input signal will be known and predetermined and also so that the deflection of the trace of the cathode-ray tube 27 may be calibrated to give quantitative measurements. For example, it may be set to produce a trace deflection sensitivity of ten millivolts per inch, whereby each inch of trace deflection will represent an increment of ten millivolts.

For this purpose there is provided an adjustable resistor 31 connected directly between the anodes of tubes 12 and 13. This resistor, which has no portion thereof grounded, serves as an adjustable partial short circuit between the anodes of tubes 12 and 13. It will be understood that with a zero input signal the anodes of tubes 12 and 13 will be at the same potential. However, upon application of an input signal the potential of one anode will increase while that of the other anode will decrease, producing a difference of potential between them. The resistor 31 tends to equalize the potentials of these anodes to an extent dependent upon its resistance, and hence adjustably reduces the sensitivity of the amplifier as a whole to the input signal. In practice, resistor 31 is adjusted at the factory to produce the desired deflection sensitivity for the amplifier and cathode-ray tube system.

By the present invention therefore there is provided a reliable and simple means of adjusting the sensitivity of a cathode-ray oscillograph and also of improving its stability. While the present invention has been illustrated as applied to a single illustrative embodiment, it will be understood that it can equally well be applied to other circuits. Accordingly, the embodiment herein described is to be considered as illustrative only and not to be taken in a limiting sense, the present invention being defined solely as recited in the appended claim.

What is claimed is:

A Cathode ray oscillograph deflection circuit comprising a pair of voltage amplifier electron tubes connected in push-pull and each having a cathode, a grid and an anode, said cathodes being connected directly together, resistance connected between said cathodes and ground, a source of positive potential, a pair of load resistances connected respectively between said source and said anodes of said tubes, a source of signals having a balanced push-pull signal output, said source being connected to ground and by substantially identical direct conductive connection to the said grids of said tubes to supply a push-pull signal to said grids, an additional variable load resistance connected directly between said anodes to reduce the gain of said deflection circuit adjustably, a cathode ray tube having a pair of deflecting plates coupled respectively to said anodes of said tubes to receive a push-pull deflection signal therefrom.

References Cited in the file of this patent

UNITED STATES PATENTS

| | | |
|---|---|---|
| 2,221,398 | Geohegan | Nov. 12, 1940 |
| 2,462,849 | Dishal et al. | Mar. 1, 1949 |
| 2,474,177 | Wild | June 21, 1949 |
| 2,542,160 | Stoner et al. | Feb. 20, 1951 |
| 2,543,434 | Bryan et al. | Feb. 27, 1951 |
| 2,550,990 | Gilbert | May 1, 1951 |
| 2,571,051 | Mizen | Oct. 9, 1951 |
| 2,613,271 | Trevor | Oct. 7, 1952 |

OTHER REFERENCES

Abstract 684,902, published Oct. 11, 1949.